United States Patent
Wagner

[11] Patent Number: 5,211,722
[45] Date of Patent: May 18, 1993

[54] DIVOT ANCHORING PROCESS

[76] Inventor: John W. Wagner, 2211 N. 56th St., Seattle, Wash. 98103

[21] Appl. No.: 780,165

[22] Filed: Oct. 21, 1991

Related U.S. Application Data

[63] Continuation-in-part of Ser. No. 388,192, Aug. 1, 1989, Pat. No. 5,058,315.

[51] Int. Cl.⁵ ............................................. A01B 79/00
[52] U.S. Cl. ......................................... 47/58; 47/48.5; 47/9; 47/1.01
[58] Field of Search .................. 47/44, 56, 48.5, 9, 47/1.01, 58

[56] References Cited

U.S. PATENT DOCUMENTS

| | | | |
|---|---|---|---|
| 3,395,625 | 8/1968 | Blanchette | 52/155 |
| 3,618,447 | 11/1971 | Goins | 85/49 |
| 3,747,927 | 7/1973 | Hoffman | 273/32 B |
| 3,884,479 | 5/1975 | Gordos | 47/56 |
| 3,914,900 | 10/1975 | Bigelow et al. | 47/9 |
| 3,954,263 | 5/1976 | Whelan et al. | 273/33 |
| 4,364,197 | 12/1982 | Baron | 47/50 |
| 5,025,969 | 6/1991 | Koester | 47/56 |

*Primary Examiner*—Henry E. Raduazo
*Attorney, Agent, or Firm*—Robert W. Beach

[57] ABSTRACT

A turf anchor stake having a flat shank with a pointed lower end and a headed upper end or two flat shanks connected by a crossbar can be driven through turf into the soil beneath the turf to hold such turf in place until the turf root structure knits with surrounding root structure. To facilitate driving of the stakes the lower ends of the shanks are pointed and lateral projections from the lower end portions of the shanks can be provided to deter withdrawal of the shanks and lifting of the turf.

4 Claims, 1 Drawing Sheet

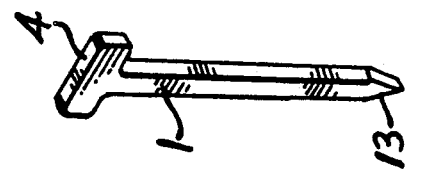
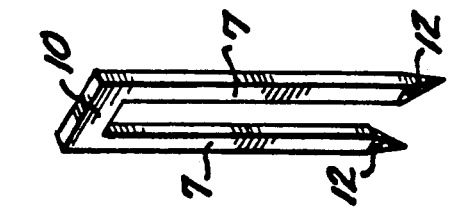
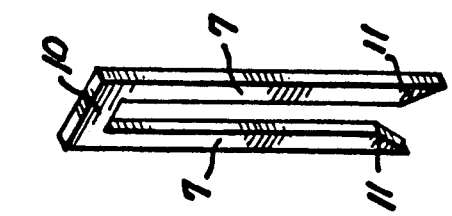
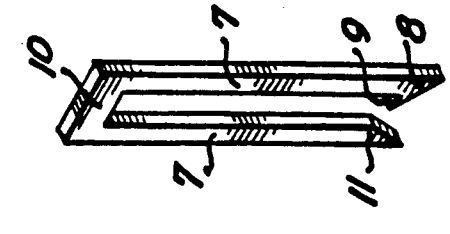
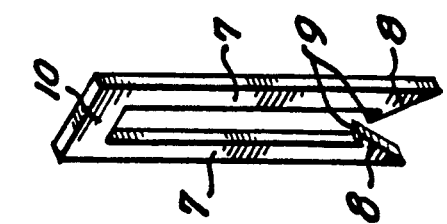
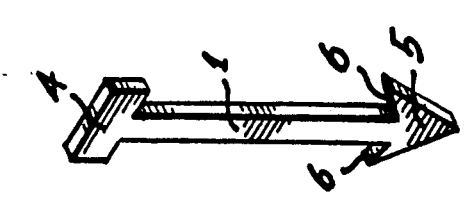
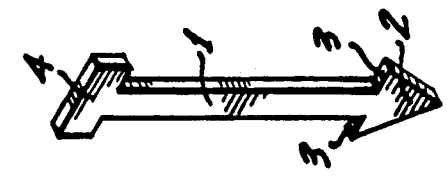
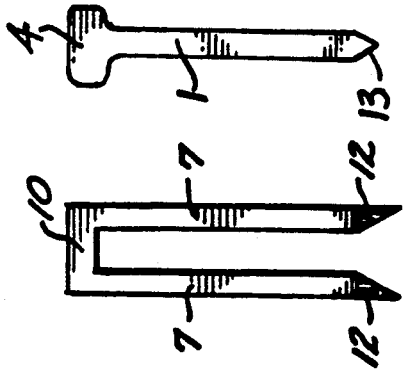
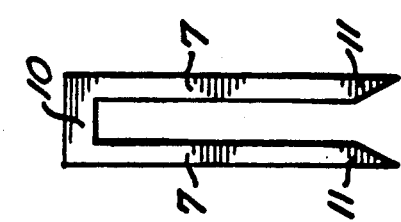
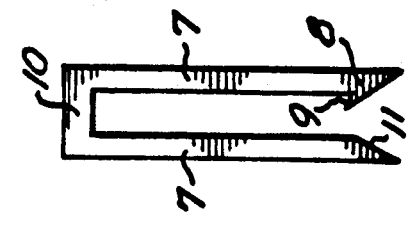
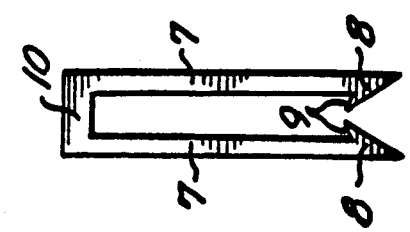
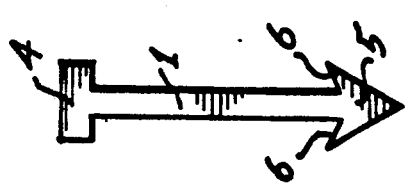
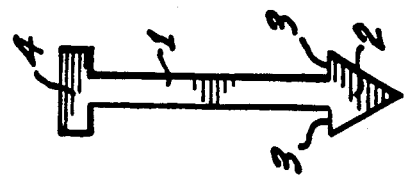

5,211,722

DIVOT ANCHORING PROCESS

CROSS REFERENCE

This application is a continuation-in-part of my co-pending U.S. patent application Ser. No. 07/388,192, filed Aug. 1, 1989, for Turf Anchor, now U.S. Pat. No. 5,058,315.

BACKGROUND OF THE INVENTION

Field of the Invention

This invention relates to a process of anchoring or securing divots in place.

Problem

In playing the game of golf, divots are frequently removed from the grass of a golf course fairway by a golfer driving a golf ball. It is customary for golfers or greenkeepers to replace divots in the cavities in the lawn formed by their removal and to step on the divots to press them back into place. It has been found, however, that birds can detect a divot that has been removed and replaced and in seeking worms a bird can lift the edges of divots with their beaks or claws to look for worms under the divots more easily than worms can be found by prospecting in the grass.

Divots partially or completely lifted by birds can, of course, be reset, but such resetting requires time and, if a divot is only partially lifted, it is more difficult to see such a divot than if it were completely removed.

Another problem is that strips of sod placed to provide an instant lawn can be shifted edgewise, particularly if the ground under the sod is wet and especially if the sodded land is on a slope.

Prior Art

As far as known to the inventor, no procedure has been followed for anchoring or securing in place replaced divots and the practice customarily followed in replacing divots has been simply to press them into their recesses manually or usually by foot pressure.

The principal expedient to deter sod from being displaced is to fence the sodded area to discourage people from walking on it.

The Goins U.S. Pat. No. 3,618,447, issued Nov. 9, 1971, relates to staples or stakes for use in fastening or retaining seeding mats in position. Such stakes or staples are made of oriented polymeric compounds such as polypropylene which will deteriorate under exposure to ultraviolet light in a period of four to fourteen weeks.

The Bigelow et al. U.S. Pat. No. 3,914,900, issued Oct. 28, 1975, relates to a ground cover sheet that is subject to degradation and may be designed to decrepitate and combine with the soil in a few weeks, or in months, or in a whole growing season, or may survive for several growing seasons. Such sheet is anchored or pinned down at intervals by pegs or plugs that contain a vertical channel or slot to receive a seed or some other plant-generating element. The plug is made of material which will eventually dissolve or crumble in the soil, but the type of material of which the pegs are made is not disclosed.

The Whelan et al. U.S. Pat. No. 3,954,263, issued May 4, 1976, discloses a golf tee having a core that is made of grass seed or plant food compound such as fertilizer enriched with soil, peat or the like. The tee is molded from the grass seed or plant food, and a carrier material, preferably carbohydrates having the empirical formula ($C_6H_{10}O_5$), i.e., starch or may be optionally made from cellulose flour, papiermache, gelatinous material, clay soil mixture or the like. The exterior of the molded tee is coated with a coating of polyurethane, mica, varnish, hard rubber, plastics, wax, fiberglass or the like, which is impervious to water but, when the tee is broken or cut with a grass mower so as to break through the protective coating and expose the growth material to moisture, the tee will be decomposed within two or three weeks. The hardness of the tee is equivalent to that of conventional wooden tees so as not to scratch, dent or mark the golf club face, but the tee should not be softer than wood so that the tee will not necessarily break the first time that it is used but may possibly be used several times like a conventional wooden one.

SUMMARY OF THE INVENTION

It is a principal object of the invention to anchor divots replaced in their recesses from which they were extracted, rather than relying merely on pressure in resetting them.

Another object is to provide a stake for securing a divot in place which can penetrate turf easily so that it can be driven by applying little force to it.

An additional object is to utilize a divot anchor that will deteriorate rather rapidly, such as by being disintegrated or dissolved by water, so that the anchor has substantially disappeared in a short time, such as a few weeks, after being implanted in ground.

The foregoing objects can be accomplished by the use of a stake of a length to penetrate through a divot and have its lower end lodged securely in the soil beneath the divot.

BRIEF DESCRIPTION OF THE DRAWINGS

FIG. 1 is a side elevation of a single shank divot anchor stake having a shank with a triangular point, and FIG. 2 is a top perspective of such stake.

FIG. 3 is a side elevation of a single shank turf anchor stake having a shank with an arrowhead tip, and FIG. 4 is a top perspective of such stake.

FIG. 5 is a side elevation of a staple divot anchor stake having twin shanks the pointed lower ends of which have inwardly directed barbs, and FIG. 6 is a top perspective of such stake.

FIG. 7 is a side elevation of a staple divot anchor stake having twin shanks the lower ends of which are pointed and one of which has an inwardly directed barb, and FIG. 8 is a top perspective of such stake.

FIG. 9 is a side elevation of a staple divot anchor stake having twin shanks with chisel-pointed tips, and FIG. 10 is a top perspective of such stake.

FIG. 11 is a side elevation of a staple divot anchor stake having twin shanks with double-tapered pointed tips, and FIG. 12 is a top perspective of such stake.

FIG. 13 is a side elevation of a single shank divot anchor stake having a shank with a double beveled point, and FIG. 14 is a top perspective of such stake.

DETAILED DESCRIPTION

The divot anchor stake used for the present invention may be of different shapes, representative forms of which are shown in the drawings. In each instance the stake would have a shank long enough to impale a divot and to enable its lower end portion to be embedded in the soil beneath the divot. Such a stake would have a length of one to four inches. Particularly if the lower end portion of the stake has a projection extending laterally from it, such as a barb, to deter upward withdrawal of the stake, the shorter stake would be of sufficient length in most instances. Stakes of different length could, however, be supplied.

Stakes of different configuration are shown in the drawings. In FIGS. 1, 2, 3, 4, 13 and 14 divot anchor stakes having a single shank 1 are shown. As shown in FIGS. 2, 4 and 14, the stakes are flat, the shaft having a width considerably greater than its thickness. The stake shown in FIGS. 1 and 2 has a pointed lower end, the upper portion of which has projections extending laterally oppositely from the opposite edges of the stake to form shoulders 3 that would engage subsoil beneath a divot for creating resistance to upward withdrawal of the stake and deter lifting of the divot or shifting of the divot. Also the flat shape deters turning of the divot about an upright axis.

The upper end of the shank, 1 carries a crossbar 4 which in the forms of divot anchor stakes shown in FIGS. 1 to 4, inclusive, 13 and 14 has cantilever ends projecting laterally beyond opposite edges of the shank. Such head can be impacted or pressed to drive the stake shank through a divot and implant its tip in the subsoil beneath the divot.

Greater resistance to withdrawal of the stake can be effected by making its pointed tip in the form of a barbed arrowhead 5 having barbs 6 projecting laterally from the opposite edges of the lower end portion of the stake as shown in FIGS. 3 and 4.

The types of divot anchor stakes shown in FIGS. 5 to 12, inclusive, have twin shanks 7 which again are flat and are disposed in spaced coplanar parallel relationship. The lower end portions of the shanks of the stake shown in FIGS. 5 and 6 have chisel points and the upper portions of the shank tips have projections extending laterally inward from the edges of the shanks to form shoulders or barbs 9 that can be driven into the subsoil beneath a divot. Such shoulders or barbs will produce resistance to deter upward withdrawal of the stakes, as discussed in connection with FIGS. 1 through 4.

In each of the stakes shown in FIGS. 5 through 12, inclusive, the upper ends of the twin shanks 7 are connected by a crossbar 10 to provide a stake of staple shape. Such stakes can be driven by applying pressure to the crossbar 10 or by striking such crossbar. The staple shape deters turning of the divot about an upright axis.

In the turf anchor stake shown in FIGS. 7 and 8, the tip of only one shank is formed as a chisel point having a projection extending laterally inward from the inner edge of its shank to form a shoulder or barb 9. The tip of the other shank is formed as a chisel point 11, but such tip does not have a projection extending laterally inward from the inner edge of the shank to form a shoulder or barb that would deter upward withdrawal of the stake.

In the forms of divot anchor stake shown in FIGS. 9 through 12, neither of the shanks 7 has a shoulder or barb on its tip to increase deterrence to upward withdrawal of the stake. The tips of the twin shanks of the stake shown in FIGS. 9 and 10 simply have chisel points 11 like that described in connection with the turf anchor staple shown in FIGS. 7 and 8. Two adjacent side of the tips of the rectangular cross section twin shanks 7 of the turf anchor stake shown in FIGS. 11 and 12 are beveled to form points tapered in both directions to make them sharper than the tips of the shanks shown in FIGS. 9 and 10.

The types of divot anchor stakes shown in FIGS. 1 through 6 are for use where the soil under the loose turf is soft so that the stakes can be driven relative easily and will have good resistance to withdrawal even though the soil is soft. The divot anchor stake shown in FIGS. 7 and 8 can be used where the soil is more firm, and the divot anchor stake shown in FIGS. 9 and 10 can be used where the soil is still harder. The turf anchor stake shown in FIGS. 11 and 12 should be used where the soil is hardest in order to enable the points 12 to penetrate a substantial distance into the soil. The friction of hard soil with the lower end portions of the turf anchor shank would be sufficiently great to deter upward withdrawal of the stake even without a lateral projection or barb of the type discussed in connection with the stakes shown in FIGS. 1 through 8, inclusive, if the stake shank is long enough.

Instead of the point on the shank tips being formed by a single bevel as shown in FIGS. 9 and 10 or by double adjacent side bevels as shown in FIGS. 11 and 12, the tip point could be formed by opposite bevels as the point 13 shown in FIGS. 13 and 14 is formed. The remainder of the staple stake could be as shown in FIGS. 9 to 12, inclusive.

Instead of providing a point by beveling opposite sides of the shank tip in a staple type of curved anchor stake, the anchor stake with such a pointed tip could have only one shank as shown in FIGS. 13 and 14 comparable to the single shank stakes shown in FIGS. 1 to 4, inclusive. Such single shank stake has a crossbar 4 forming a T-head stake similar in such respect to the stakes shown in FIGS. 1 to 4, inclusive.

A single shank stake of the type shown in FIGS. 13 and 14 is suitable for use in a majority of the applications where the soil beneath the divot is reasonably firm or hard so that the soil will grip the tip of the stake sufficiently firmly to deter its withdrawal under most circumstances even though the tip does not have one or more lateral projections or barbs such as shown in FIGS. 1 to 8, inclusive.

Penetration of the divot anchor stake is facilitated by making it flat. Also, such flat shape enables the crossbar head 4 or 10 to be substantially embedded in the upper portion of the divot so that the stake is not obtrusive or even easily detected. Moreover, the head of the divot anchor stake is sufficiently embedded in the upper portion of the divot so as to not be struck by the blades of a lawnmower cutting the grass even in making a close cut.

The need for securing a divot in place is relatively temporary, that is, until the root structure can penetrate appreciably into the soil beneath the divot. Such attachment of the divot will usually take several weeks, but the time required will be shorter if the grass is watered normally. It is desired to avoid the trouble and expense of extracting the divot anchor stakes when the divots have grown into place. To avoid removing the divot anchor stakes, they are made of material that will deteriorate rapidly, that is, the integrity of the body of the stake will be destroyed within a few weeks, particularly under moist conditions which promote root growth. Such deterioration can occur by making the stake of material that can either be dissolved gradually by irrigation water or can be disintegrated into powder or small fragments by such water.

Preferably the stakes are made principally of consolidated particulate material which is either biodegradable or which can be assimilated into the soil after disintegration. While fine sawdust could be used, for example, a preferred material is peat or peat moss particles. In either case, consolidation of the particles is effected by molding them to the desired shape of stake described above, either simply by compacting the body of particles under pressure, or by pressing the body of particles in a mold after being mixed with a suitable binder, or by filling a mold with the particulate material mixed with a suitable settable binder without pressure. Disintegration of the particulate material can be expedited if the binder is water soluble.

Following formation of the stakes in the mold, disintegration of the stakes can be delayed by soaking the die-formed stakes in a material such as wax, for example paraffin, or a mixture of paraffin and polyolefin. The polyolefin could be Bocon 1200 of the I.G.I. Boler Co. of Philadelphia, Pa. The wax treatment would prevent disintegration of the stake until it has been subjected to water for a few weeks. The paraffin could be from 25 percent to 50 percent of the treating material and the balance polyolefin.

The stakes can be made of other types of comminuted material which would be biodegradable and/or assimilatable by the soil such as cornstalks, bagasse, wood pulp, cardboard or particle board.

In any event, the important characteristics of the material are that stakes made of it will be sufficiently strong to be driven through divots into the ground beneath them and which will deteriorate within a few weeks when subjected to water, so that the body of the stake will either disintegrate or dissolve and the resulting material will be dissipated, either by being decomposed, carried away in the form of a solution, or assimilated into the soil.

I claim:

1. A process for replacing or securing a divot to the soil comprising the steps of positioning said divot in the location where it is to be secured, impaling said divot with a stake made of a material which will deteriorate within a few weeks, and leaving said stake in place to prevent movement of said divot during a long enough time span to permit root growth to occur.

2. The process defined in claim 1, including deterring turning of the divot about an upright axis while it is being held by the stake.

3. The process defined in claim 1, including subjecting the stake to irrigation water for facilitating deterioration thereof.

4. The process defined in claim 1, including the step of fabricating the stake from a material which will gradually dissolve in water.

* * * * *